(12) United States Patent
Cote et al.

(10) Patent No.: US 8,646,796 B2
(45) Date of Patent: Feb. 11, 2014

(54) APPARATUS AND METHOD FOR EXTRACTING VIBRATION DATA FROM A MOVING DRIVE CHAIN

(76) Inventors: Alan Cote, Williston, VT (US); John Croy, Middletown, RI (US); Jean Joseph Cote, Lunenburg, MA (US)

( * ) Notice: Subject to any disclaimer, the term of this patent is extended or adjusted under 35 U.S.C. 154(b) by 0 days.

(21) Appl. No.: 13/392,250

(22) PCT Filed: Aug. 24, 2010

(86) PCT No.: PCT/US2010/046434
§ 371 (c)(1),
(2), (4) Date: Jun. 7, 2012

(87) PCT Pub. No.: WO2011/028508
PCT Pub. Date: Mar. 10, 2011

(65) Prior Publication Data
US 2012/0261895 A1   Oct. 18, 2012

Related U.S. Application Data

(60) Provisional application No. 61/274,984, filed on Aug. 24, 2009, provisional application No. 61/353,560, filed on Jun. 10, 2010.

(51) Int. Cl.
*B62K 17/00* (2006.01)
(52) U.S. Cl.
USPC ........................................ 280/281.1

(58) Field of Classification Search
USPC ............................................... 280/219, 281.1
See application file for complete search history.

(56) References Cited

U.S. PATENT DOCUMENTS

| | | | |
|---|---|---|---|
| 6,356,848 B1 * | 3/2002 | Cote et al. | 702/44 |
| 7,354,364 B2 * | 4/2008 | Glas et al. | 474/140 |
| 7,975,561 B1 * | 7/2011 | Ambrosina et al. | 73/862.338 |
| 2003/0188579 A1 | 10/2003 | Evans et al. | |
| 2005/0016276 A1 | 1/2005 | Guan et al. | |
| 2005/0203697 A1 | 9/2005 | Dalgleish | |
| 2009/0119032 A1 | 5/2009 | Meyer | |

FOREIGN PATENT DOCUMENTS

EP        0697332 A1    2/1996

* cited by examiner

*Primary Examiner* — Tashiana Adams
(74) *Attorney, Agent, or Firm* — Hodgson Russ LLP

(57) ABSTRACT

The invention relates to an apparatus and method for extracting vibration data from a moving drive chain. In the preferred embodiment, the chain is that of a bicycle, or similar pedaled machine such as an indoor stationery bicycle, with two or more sensors placed on the chainstay of the bicycle to measure the vibrational frequency of the chain. Such vibration data can be used to determine the tension of the chain, and may also further compute the power transmitted by the chain, in conjunction with the measurement of chain speed. The invention provides a method and apparatus for conditioning and filtering the signals from the vibration sensors, as well as an arrangement for positioning the sensors on the bicycle.

17 Claims, 2 Drawing Sheets

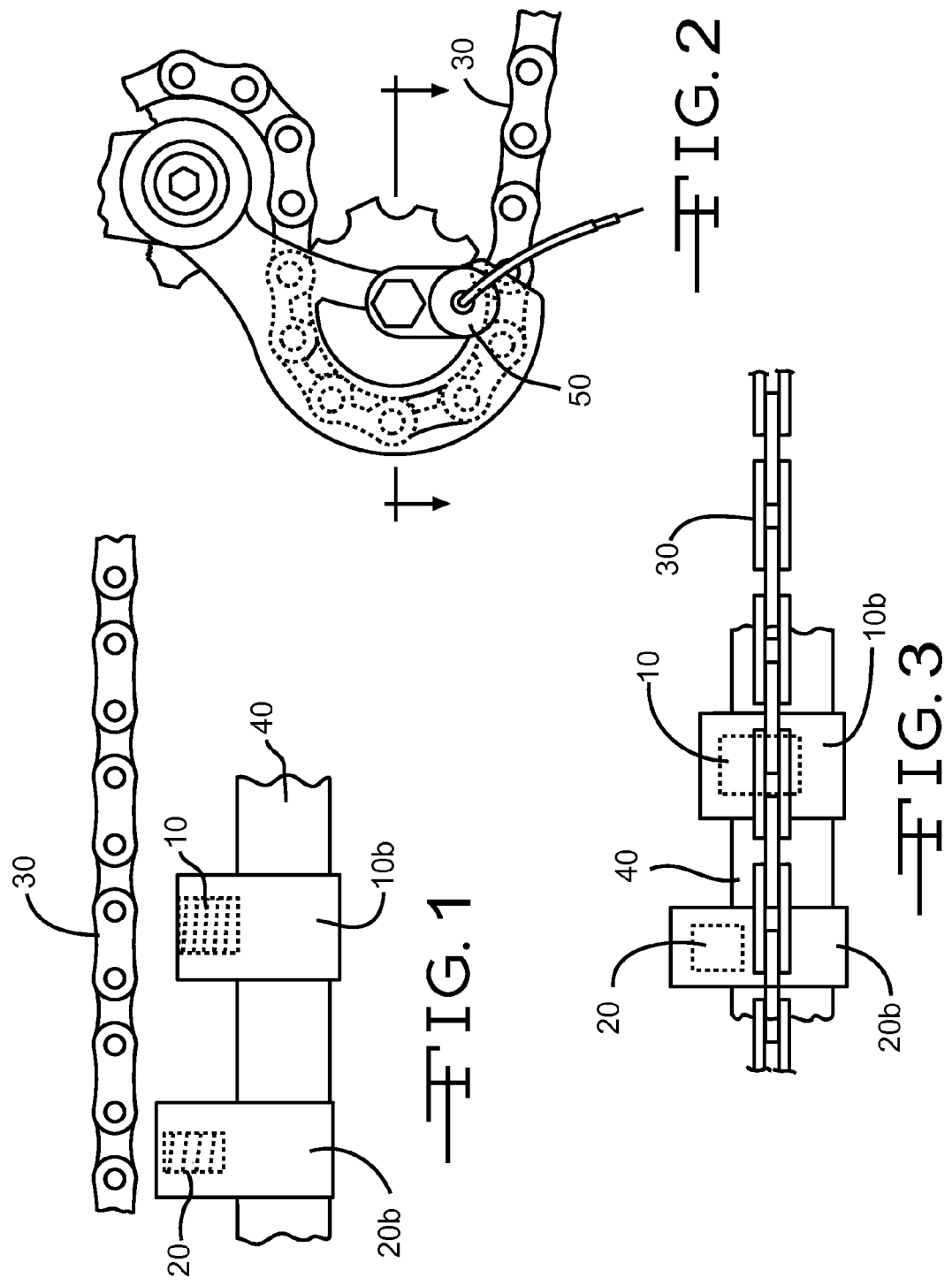

APPARATUS AND METHOD FOR EXTRACTING VIBRATION DATA FROM A MOVING DRIVE CHAIN

CROSS-REFERENCE TO RELATED APPLICATION

This application claims the benefit of priority to U.S. provisional patent application Ser. No. 61/274,984 filed Aug. 24, 2009, and to U.S. provisional patent application Ser. No. 61/353,560 filed Jun. 10, 2010, the disclosures of which are incorporated herein by reference.

FIELD OF THE INVENTION

The invention relates to an apparatus and method for extracting vibration data from an elongate flexible member. In the preferred embodiment, the elongate flexible member is a chain that engages cogs, such as the chain of a bicycle. Such vibration data can be used in systems that calculate the tension of the chain through its frequency of vibration. Such systems may also further compute the power transmitted by the chain, in conjunction with the measurement of chain speed.

BACKGROUND OF THE INVENTION

U.S. Pat. No. 6,199,021, and related C.I.P. U.S. Pat. No. 6,356,848 describe an apparatus and method for measuring the vibrational frequency of an elongate flexible member such as a bicycle chain. In such a system, a magnetic coil is used to measure the vibrational frequency of the chain. One obstacle that must be overcome with this system is an interference signal caused by the linear motion of the chain links moving past the magnetic coil sensor. This signal can obscure the vibrational frequency signal of the chain, where the vibrational frequency is directly related to the tension carried by the chain. Patents '021 and '848 disclose various methods to differentiate and filter these two signals.

The magnetic coils used in the inventive system are similar to the coils used in other applications, including electric guitars. Guitar applications must overcome a different signal interference issue, where the coil detects not only the desired signal of the vibrating strings, but also a 60 Hz signal from electrical supply lines. Guitars have solved this problem by using two separate coils, wound in opposite directions, which effectively filters the 60 Hz noise through destructive interference. This dual coil arrangement is commonly referred to as a humbucker, with variations of the system also used.

While a humbucker system is in some respects analogous to the inventive device, there are, however, significant differences in the systems. With a guitar, the interference signal is generated from an outside source. But in the application of the inventive device, the chain itself generates several different frequencies, mainly due to the chain being a non-homogonous body. In addition, the inventive device works in conditions where these frequencies are constantly varying, unlike a constant 60 Hz interference signal.

BRIEF SUMMARY OF THE INVENTION

The invention relates to an apparatus and method for extracting vibration data from a moving drive chain. In the preferred embodiment, the chain is that of a bicycle, or similar pedaled machine such as an indoor stationery bicycle, with two or more sensors placed on the chainstay of the bicycle to measure the vibrational frequency of the chain. Such vibration data can be used to determine the tension of the chain, and may also further compute the power transmitted by the chain, in conjunction with the measurement of chain speed. The invention provides a method and apparatus for conditioning and filtering the signals from the vibration sensors, as well as an arrangement for positioning the sensors on the bicycle.

DESCRIPTION OF THE DRAWINGS

For a fuller understanding of the nature and objects of the invention, reference should be made to the following detailed description taken in conjunction with the accompanying drawings, in which:

FIG. 1 is sideview showing two vibration sensors on the chainstay of a bicycle frame;

FIG. 2 is a sideview showing a chainspeed sensor mounted to the rear derailleur of a bicycle;

FIG. 3 shows a topview of two vibration sensors on the chainstay of a bicycle.

DETAILED DESCRIPTION OF THE INVENTION

Figure 4:
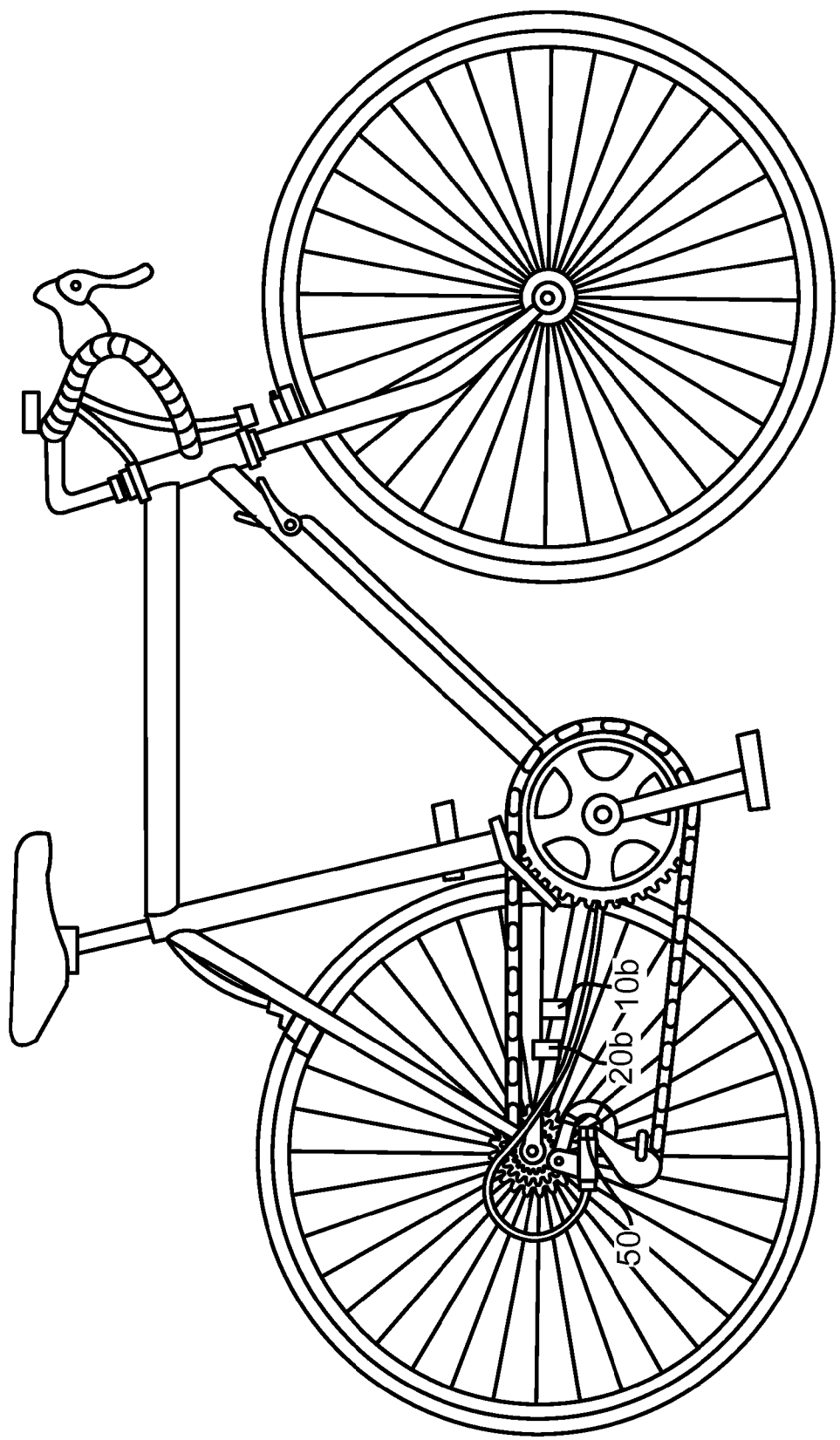
FIG. 4 shows the position of three sensors on a complete bicycle.

In the preferred embodiment, the apparatus uses two sensors mounted to the chainstay of a bicycle frame. Theses sensors are typically magnetic coils of the variable reluctance type, though other types including but not limited to Hall Effect, magneto resistive sensors, inductive, capacitive, optical and acoustic sensors may also be used. While the preferred embodiment uses two sensors, a greater number may also be used. The algorithm described below enable two sensors, but it can be readily appreciated that the system can be expanded to include additional sensors. Each sensor may be the same type of sensor, or each may be a different type of sensor. The sensors may be the same size or different sizes.

The two coils, tension sensor 1 and tension sensor 2 respectively, are positioned in proximity to the section of the drive chain that is under tension during the forward motion of the bicycle pedals. These coils generate a voltage when the chain is in under tension and in motion from the pedaling of the bicycle. A third coil is typically mounted to the rear derailleur of the bicycle. This third coil, the chain speed sensor, measures the speed of the chain links moving past, also via a voltage signal.

FIG. 1 is sideview showing sensor 10, sensor 20; their respective housings 10b and 20b; the bicycle drive chain 30; and the frame portion of the bicycle, chainstay 40. The spacing between sensor 10 and sensor 20 will be described further detail below.

FIG. 2 is a sideview showing sensor 40, as mounted to the rear derailleur of a bicycle.

FIG. 3 shows a topview of sensor 10, sensor 20, and bicycle drive chain 30.

FIG. 4 shows the position of sensor 10, sensor 20, sensor 30, and bicycle drive chain 30 in a sideview of a complete bicycle.

In a power measurement system for a bicycle that analyzes chain vibration in order to determine chain tension, it is necessary to eliminate signals other than the chain vibration signal. The sensor in such a system will typically be a variable reluctance sensor (magnetic pickup coil), although other types may be used. The sensor will produce a sensor signal at least a portion of which corresponds to the fundamental standing wave vibration of the chain, at frequency $F_V$. In addition, for a non-homogeneous object such as a chain, the motion of the links past the sensor will cause an additional portion of the signal to be produced at frequency $F_L$. For a bicycle chain, these two frequencies will often be at near or at similar frequencies. It is necessary to distinguish between the two portions of the sensor signal in order to determine which is to be used for calculating chain tension.

In the existing design, the primary method used for eliminating the $F_L$ signal is to use an additional speed sensor, 50, mounted on a derailleur jockey pulley, which will detect only the $F_L$ signal with no $F_V$ signal. In FIG. 2, speed sensor 50 is shown facing a fraction of the side of chain 30; for practical purposes and a stronger signal, the speed sensor is ideally longer and lined-up directly with the mid-point height of the chain, thus aimed at an entire chain link. This speed sensor 50 is used to determine the chain speed (which is used in the final power calculation), but can also be used to create a notch filter that is applied to the sensor signal from the main sensor. The resulting filtered sensor signal is then analyzed to determine the strongest remaining frequency, and this is assumed to be $F_V$. However, when $F_V$ and $F_L$ are close together, the notch filter has the undesired effect of also suppressing $F_V$. Frequency tracking methods can be used to determine when this is occurring, and to interpolate the correct frequency, but it is desirable to have a method that will suppress $F_L$ without affecting $F_V$.

Instead of a single main sensor, embodiments of the present invention use a pair of similar sensors, 10 and 20. These sensors 10 and 20 are mounted at different points along the length of the tensioned section of the chain 30, at a particular spacing. The fundamental standing wave vibration is essentially a sinusoidal mode, and the phase of that signal will be the same irrespective of where along the length of the chain the sensor is located. The sensor signal produced by the chain links, however, has a phase that is entirely dependent on the position of the sensor. Moving a sensor through a distance equal to the length of a link will move the sensor signal through 360 degrees of phase. Experiments have shown that this signal is also nearly sinusoidal. Therefore, by placing two sensors at the same distance from the chain, but at different points along the chain, they will produce outputs that have the $F_V$ signals with matching phase, but the $F_L$ signals at different phase.

This design places the sensors at points that are at a spacing of $(n+0.5) D_L$, where n is an integer and $D_L$ is the length of a single chain link. For practical purposes, in the case of a bicycle chain where the link pitch is 0.5", this may typically be 1.25" or 1.75". Such a spacing will result in both sensors producing sensor signals having $F_V$ portions that are in-phase, but $F_L$ portions that are exactly out-of-phase. Adding these two portions together will create the desired result of destructive interference and cancellation of the $F_L$ portion, along with constructive interference and enhancement of the $F_V$ portion. This will be the case even when the two portions are at the same frequency. The strongest portion of the sensor signal can be assumed to be the $F_V$ portion.

In order to maximize the effect, it may be useful to normalize the amplitudes of the two sensor signals prior to adding them together. In this case, the normalization factors should be based on the relative strengths of the $F_L$ portions as observed over some period of time preceding the sample under consideration. This is because in cases where the $F_V$ and $F_L$ portions coincide, the sensors may have significantly different strengths at that frequency due to phase interference between the two sensor signals. However, the factors that will tend to change the relative strengths of the $F_L$ portions between the two sensors signals (e.g. changing the gear selection, or significant changes in chain speed) will be infrequent occurrences, and using slowly-changing normalization factors is appropriate. The $F_L$ portion can be identified by matching it to the frequency from the derailleur speed sensor 50, and if the $F_V$ and $F_L$ portions coincide, calculation of the normalization factors can be temporarily suspended. Also, if the ratio of the angular rotation speeds of the cranks and the wheel changes (as determined from additional sensors), that will indicate that the rider has shifted gears, and the normalization factors can be reset to a nominal value. By also using the speed speed sensor 50, it is possible to determine what chainring and sprocket are being used. This provides for the option of maintaining a table of normalization factors corresponding to each gear selection, in order to pre-load the values after a gear shift.

In the case of magnetic coil pickups, the relative phases of the $F_L$ portion may not match theory if the fields of the two magnets affect each other. If the magnets are close enough together, they may produce an effective phase difference for $F_L$ that is different from the actual geometric spacing between the coils, and this difference may vary with the distance between the sensors and the chain. In order to minimize this effect, one approach is to move the sensors 10 and 20 further apart while observing the $(n+0.5)D_L$ spacing, e.g. 2.75" or 3.25". Another approach is to place one or more additional magnets fore and aft of (or between) the two sensor magnets, in order to approximate the situation where the two sensors are part of an infinite echelon of magnets in which each would be affected equally by its neighbors and there would be no deviation from the theoretical phase relationship.

In one embodiment of the invention, chain tilt correction may be employed. The chain may not always be parallel to the plane of the two magnetic coil pickups. In this case, the apparent pitch of the chain, from the perspective of the two magnetic coils becomes 0.5 cos(angle of chain). To correct for this, the chain tilt correction algorithm may be applied. In reality, the best solution is to physically narrow the gap between sensors, or tilt the plane of the sensors. In lieu of doing that, a beam forming technique is applied, where a delay is induced in one of the channels such that when the 2 channels are summed, the interference signal is minimized. The delay depends on $F_L$. Generally the speed of the chain doesn't vary by such an amount that this delay has to be computed regularly. Instead, it can be computed at a low frequency, say every 5 seconds, and the correction applied periodically. The chain tilt correction identifies a shift to be applied to one of the channels such that when the two channels are added together, it minimizes the interference pin signal $F_L$.

Sensors 10 and 20 can also be positioned in a number of different ways. The simplest configuration is to position sensors 10 and 20 in a linear, or near-linear manner, directly along the chainstay 40 of a bicycle. In this manner, the first sensor 10 may be positioned at a first lateral position with respect to the chain, and the second sensor 20 may be positioned at a second lateral position with respect to the chain. The first lateral position and the second lateral position may be different (see, e.g., the position of sensors in FIG. 3). The position of each sensor can be further adjusted, if desired, to optimize the distance between the top planar surface of each coil sensor and the chain 30. This distance is known as the air gap. Air gap varies as the bicycle is shifted between different gear combinations, both at the rear hub and at the front chainrings, causing changes in the position of chain 30 relative to sensors 10 and 20. In general, it is preferred to position the sensors 10 and 20 near the midpoint between the front crank spindle and rear wheel axle. The rearward sensor 20 (that is, the sensor closest to the rear hub of the bicycle), may be positioned closer to the rear wheel spokes than the front sensor 10; this can be seen when viewed from the top as in FIG. 3, In addition, the top planar surface of the rearward sensor 20 may be higher (that is, further from the ground) than the top planar surface of the front sensor 10; this can be seen when viewed from the top as in FIG. 3. By positioning the sensors in this manner, the air gap can be more carefully controlled as different gear combinations of the bicycle are used.

Algorithm

Given:
1. collect data from 3 channels each recording at 500 hz
   a. channel1 is twang1
   b. channel2 is twang2
   c. channel3 is pin (this could be sampled separately from channels 1 & 2)
2. compute autobias of channel1 and apply autobias correction
   a. compute running average of last n samples, this is the bias of the signal from zero. Subtract this bias from each subsequent channel1 value.
3. compute autobias of channel2 and apply autobias correction
   a. compute running average of last n samples, this is the bias of the signal from zero. Subtract this bias from each subsequent channel2 value.
4. compute amplitude of channel1 and apply normalization correction by either method 1 and/or method 2:
   a. Method 1: compute running average of absolute value of last n samples. Divide each subsequent value of channel1 by this average. Call this $F_{V1}$
   b. Method 2: record the strengths of the $F_L$ signal whenever it is determined that $F_L$ and $F_V$ are at different frequencies, and use the prior strength of the $F_L$ signal as the divisor instead of the running average.
5. compute amplitude of channel2 and apply normalization correction by either method 1 and/or method 2:
   a. Method 1: compute running average of absolute value of last n samples. Divide each subsequent value of channel2 by this average. Call this $F_{V2}$
   b. Method 2: Alternatively, record the strengths of the $F_L$ signal whenever it is determined that $F_L$ and $F_V$ are at different frequencies, and use the prior strength of the $F_L$ signal as the divisor instead of the running average.
6. compute $F_L$ frequency of channel3 using zero crossings algorithm
7. Optional chain tilt correction:
   a. Compute correction periodically (every 5 seconds or so) or if $F_L$ varies by more than threshold $T_{FL}$
   b. Starting at offset i=min (−5 for example), add $F_{V1}$ and $F_{V2}$ together by shifting $F_{V2}$ by i.
   c. Measure power at frequency $F_L$. Algorithms to do this could be FFT, Fourier, Goertzel, etc. Record this value.
   d. Iterate to step b, using next value of i until i=max (5 for example)
   e. Once done iterating, choose offset such that $F_L$ amplitude is minimized. Call this $C_T$
   f. Use this $C_T$ correction value in step 8 until next chain tilt correction cycle
8. sum $F_{V1}$ and $F_{V2}$ applying optional correction value $C_T$ by shifting $F_{V2}$ by $C_T$ samples before summing, call this $F_{V3}$
9. compute power of $F_{V3}$ using power spectrum algorithms
10. choose frequency where power is maximized An alternative algorithm uses a phase shift to filter the signal, as follows:

Inputs:
Channel 1—tension sensor #1
Channel 2—tension sensor #2
Channel 3—chain speed sensor Description of Algorithm
1. read channels 1,2,3 into data structures chan1, chan2, chan3
2. autobias chan1, chan2
3. normalize chan1, chan2
4. compute pin frequency by applying Zero Crossings algorithm to chan3
5. compute shift required so us to minimize pin frequency
   a. define lower and upper limits of time shifts
   b. define number of samples required & break into block size pieces
   c. for each time shift
      i. for each block
         1. compute power of pin frequency using Goertzel algorithm
         2. sum and average power at each time shift
   d. choose shift which has lowest power, thus minimizing pin freq
6. sum chan1 and chan2 applying shift to chan2 into data structure chansum
7. notch pin frequency using adaptive bandpass filter
   a. use Least Mean Square 5 pole filter to notch pin signal
8. run FFT
9. select highest power bin which is not pin frequency bin
10. sum and average these FFTs, and save as average FFTs
11. select highest power bin which is near average FFTs
12. convert bin position to tension frequency
13. convert pin frequency to chain speed
14. convert tension frequency and chain speed to force and power
15. median filter and average power In the above, the use of the chain speed sensor, or channel 3, is also recited. This sensor is used in conjunction with the computed chain tension values to produce a power value.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An apparatus for measuring the tension of a moving drive chain having spaced apart link pins, comprising: at least two sensors proximate to the chain and spaced from each other along the length of the chain, each sensor having a signal output for providing a sensor signal; a processor in communication with the signal outputs of the at least two sensors; wherein the sensor signals of the at least two sensors are analyzed by the processor to calculate a chain tension; and wherein the processor analyzes the sensor signals by identifying portions of the sensor signals which are out of phase with one another.

2. The apparatus of claim 1, wherein the at least two sensors are spaced from each other by a distance equivalent to a non-integer multiple of the spacing between link pins.

3. The apparatus of claim 2, wherein the at least two sensors are spaced from each other by a distance substantially equivalent to an integer multiple of the spacing between link pins plus ½ of the spacing between link pins.

4. The apparatus of claim 1, further comprising a speed sensor capable of measuring a speed of the chain and having a speed output for providing a speed signal; and wherein the processor is in communication with the speed output.

5. The apparatus of claim 4, wherein the processor calculates a tension of the chain by comparing in-phase portions of the sensor signals with the speed signal.

6. The apparatus of claim 1, wherein a first of the at least two sensors is disposed closer to the chain than a second of the at least two sensors.

7. The apparatus of claim 6, wherein a top surface of the first sensor is disposed closer to the chain than a top surface of the second sensor.

8. The apparatus of claim 1, wherein a first of the at least two sensors is in a first lateral position with respect to the chain, and a second of the at least two sensors is in a second lateral position with respect to the chain, wherein the first lateral position is different from the second lateral position.

9. A method for measuring the tension of a moving drive chain having a link spacing, comprising the steps of: providing at least two sensors proximate the chain, each sensor producing a sensor signal depending on a position of the chain; analyzing the sensor signals to identify portions of the sensor signals which are out of phase with one another; combining the sensor signals to produce a resultant signal; removing the identified frequencies from the resultant signal; and calculating a chain tension of the chain based on the resultant signal.

10. The method of claim 9, wherein analyzing the sensor signals further comprises the steps of: transforming each sensor signal to a frequency domain; and identifying the frequencies of the sensor signals which are out of phase with each other.

11. The method of claim 10, wherein removing the identified frequencies is accomplished using a notch filter.

12. The method of claim 9, further comprising the steps of: calculating a speed of the chain; and calculating power transmitted by the chain using the chain tension and the speed of the chain.

13. The method of claim 12, wherein the speed of the chain is calculated using the out of phase portion of the sensor signals.

14. The method of claim 12, further comprising the step of providing a speed sensor proximate to the chain, wherein the speed of the chain is calculated using the speed sensor.

15. The method of claim 9, wherein the sensor signals are processed using phase cancellation techniques.

16. The method of claim 9, wherein the sensors are spaced from each other by a distance equivalent to a non-integer multiple of the link spacing of the chain.

17. A bicycle, comprising: a frame; a chainring rotatably connected to the frame; a pedal in fixed relation to the chainring and able to cause the chainring to rotate with respect to the frame; a wheel rotatably connected to the frame; at least one sprocket in ratcheting relation to the wheel and able to cause the wheel to rotate in a first direction; a chain in engaging communication with the chainring and the at least one sprocket such that rotation of the chainring causes rotation of the at least one sprocket; at least two sensors affixed to the frame and proximate to the chain, each sensor having a signal output for providing a sensor signal; a processor in communication with the signal outputs of the at least two sensors; wherein the sensor signals of the at least two sensors are analyzed by the processor to calculate a chain tension, and wherein the processor analyzes the sensor signals by identifying portions of the sensor signals which are out of phase with one another.

* * * * *